United States Patent [19]
Wakata et al.

[11] Patent Number: 5,429,524
[45] Date of Patent: Jul. 4, 1995

[54] COUPLING DEVICE OF CHARGING CONNECTOR ASSEMBLY FOR ELECTRIC CAR

[75] Inventors: Shigekazu Wakata; Hikaru Itou; Sho Miyazaki; Tsutomu Tanaka; Eiji Saijo, all of Yokkaichi, Japan

[73] Assignee: Sumitomo Wiring Systems, Ltd., Japan

[21] Appl. No.: 226,943

[22] Filed: Apr. 13, 1994

[30] Foreign Application Priority Data

Apr. 16, 1993 [JP] Japan ............... 5-113913
Apr. 16, 1993 [JP] Japan ............... 5-113914
Apr. 19, 1993 [JP] Japan ............... 5-116343
Apr. 19, 1993 [JP] Japan ............... 5-116344

[51] Int. Cl.⁶ ........................... H01R 13/453
[52] U.S. Cl. ........................... 439/310
[58] Field of Search ............. 439/261, 372, 341, 342, 439/835, 822, 310, 476, 483

[56] References Cited

U.S. PATENT DOCUMENTS

| | | | |
|---|---|---|---|
| 2,329,479 | 9/1943 | Neill | 439/372 X |
| 3,950,059 | 4/1976 | Anhalt et al. | 439/261 OR |
| 4,083,619 | 4/1978 | McCormick et al. | 439/310 OR |
| 4,624,472 | 11/1986 | Stuart et al. | 439/310 X |
| 5,344,331 | 9/1994 | Hoffman et al. | 439/310 X |

FOREIGN PATENT DOCUMENTS 190068  8/1991  Japan .
334908 11/1992  Japan .

Primary Examiner—Larry I. Schwartz
Assistant Examiner—Daniel Wittels
Attorney, Agent, or Firm—Bierman and Muserlian

[57] ABSTRACT

A coupling device interconnects a car connector BC and a charger connector SC positively by a small force to charge a battery in an electric car. After incompletely coupling, when an operation lever 8 together with a grip 32 are grasped, a sector gear 16 is turned to an anticlockwise direction and a pinion 15 is rotated to the anticlockwise direction through an intermediate gear 17. Thus a coupling plate 10 is moved from an advanced position to a retracted position through engagement of the pinion 15 and a rack 13. Distal ends of the coupling plates 10 are closed during a former movement of the plates so that windows 21 in the plates receive projections 22 on a connector housing of a car connector BC. A connector housing 2 of a charger connector SC together with a body 3 are drawn into the housing 1 during a latter movement of the plates, thereby completely interconnect both connectors BC and SC. When the lever 8 returns to an opening position, the coupling plate 10 is backed from the retracted position to return the housing 2 together with the body 3 and detach the housing 1. When the body 3 is pulled, both connectors BC and SC are separated.

13 Claims, 18 Drawing Sheets

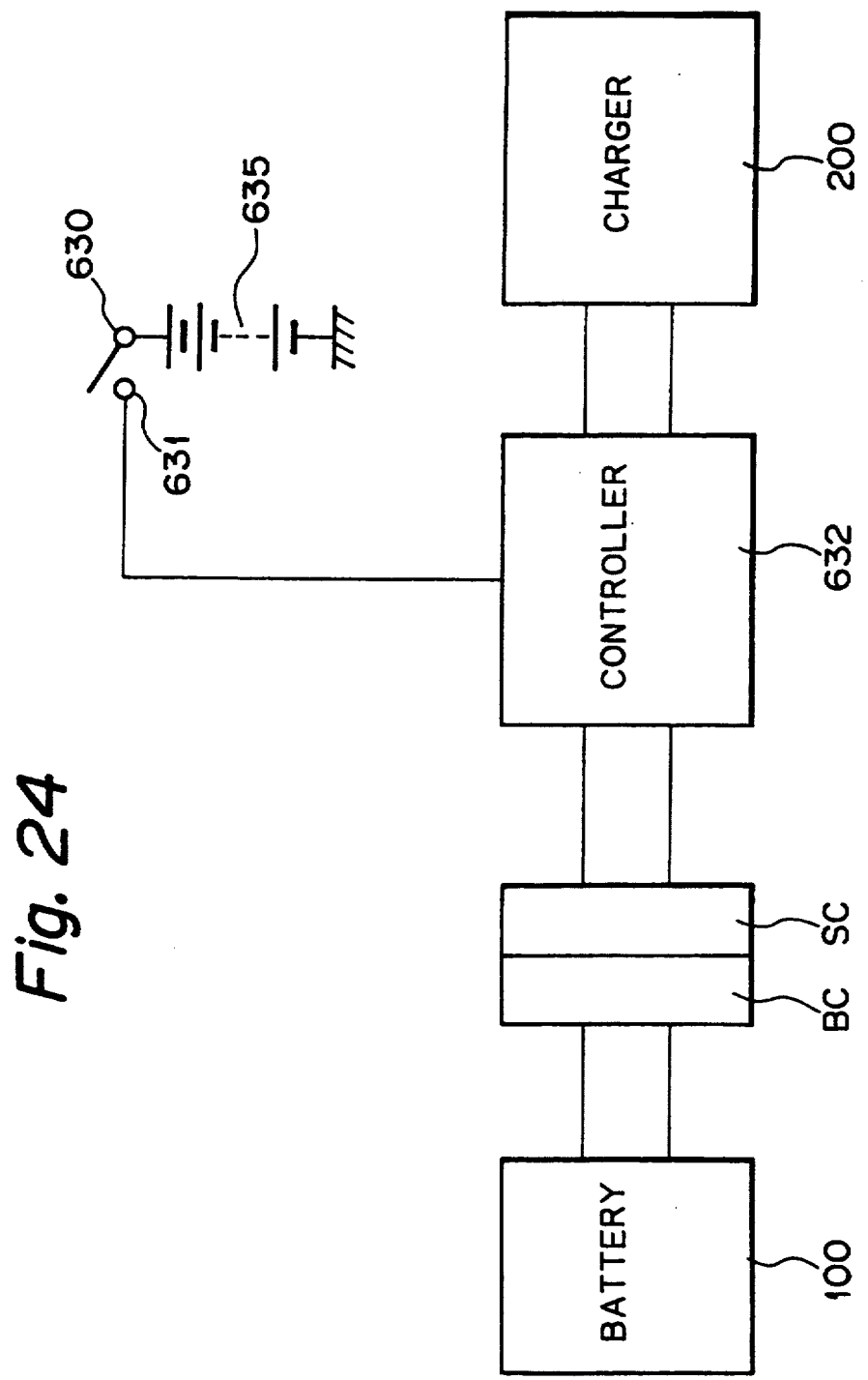

COUPLING DEVICE OF CHARGING CONNECTOR ASSEMBLY FOR ELECTRIC CAR

BACKGROUND OF THE INVENTION

1. Field of the Invention

This invention relates to a coupling device of a charging connector assembly for an electric car and more particularly to a coupling device which can be operated under a relatively small force.

2. Statement of the Prior Art

Electric cars will find increasing use in the near further. As such, the problem of battery charging must be overcome. In particular, a charging connector assembly raises an important problem. The charging connector assembly comprises a car connector connected to a battery in an electric car and a charger connector connected to a charger through a cable.

A problem arises in that it is necessary to apply a large force to the charging connector in order to positively interconnect terminals in each connector. If a substantial load is caused due to friction resistance between the connectors during coupling, this may be mistaken for complete coupling. In the case of conducting a charging current through an assembly in an incomplete coupling state, the terminals generate heat or may spark when the connectors are displaced.

It is important to avoid a situation whereby a charging commences when a connector assembly is in an incomplete coupling state. Otherwise, abnormal heat may be generated in the assembly, oxidation due to sparks may be caused on the terminals in the assembly, or the assembly may impart an electrical shock to an operator.

There is a conventional charging connector in which one connector is provided on an outer periphery of an end with a male thread and the other connector is provided on an outer periphery with a rotatable ring which has a female thread adapted to be engaged with the male thread.

The connectors are electrically interconnected by being opposed with the rotatable ring being rotated so as to mate the male and female threads. The connectors are electrically disconnected from each other by turning the rotatable ring in a reverse direction.

In the conventional connector assembly mentioned above, the male and female threads are mated with each other by rotation of the rotatable ring to couple both connectors. However, coupling of thread engagement can be easily released.

In comparison with a car connector secured to the car, the charger connector is connected to the charger through the cable.

The charging connector assembly is of a relatively large size since a charging current is high and terminals are made large in size to accommodate a high current. Since the charger connector is connected to an end of the long cable, the total weight of the connector and cable is large. Accordingly, it is necessary to make handling of the charger connector easy before hand.

Both connectors must be locked to prevent the charger connector From falling off from the car connector after being coupled. However, an operator must continuously maintain a coupling force until a locking operation has been completed, which is tiring. If the operator releases his hold from the connector assembly when it is in an incomplete coupling state, the charger connector may be damaged.

A coupling device of a charging connector assembly for an electric car must maintain a car connector and a charger connector in a coupling state during charging and release the connectors from coupling after finishing charging. A coupling device having a lock piece is known which engages with, for example, the charger connector by rotation to maintain the coupling state of both connectors.

However, in the case of using such a coupling device, the operator must hold the charger connector by one hand and handle the lock piece by the other hand. Such handling will be troublesome for the operator. Further, the operator must handle the lock piece again to release the connectors after charging has finished.

In a real charging operation, the operator holds the charger connector and pushes it onto the car connector. If, in this case, insulation in the charger connector should deteriorate to leak out the charging current, a serious accident may occur.

As described above, it is necessary to take into consideration of coupling operation and safety of charging in designing of the charging connector assembly. For example, a mechanism for aiding a coupling force or a switch mechanism which permits conduction after confirming a safe condition is required. Particularly, it will be preferable to form the charger connector into a gun type shape in order to facilitate the coupling operation. In addition to the gun type shape, a lever may be provided to enhance handling of the coupling device.

However, even if the lever is provided on the device, it may be actuated before completing a condition of coupling aid and safety unless the lever is constrained from operating under an unsafe condition.

SUMMARY OF THE INVENTION

A first object of the present invention is to provide a coupling device which can positively unite a charging connector assembly for an electric car under a relatively small force.

A second object of the present invention is to provide a coupling device which can positively and safely charge a battery in an electric car through a charging connector assembly.

A third object of the present invention is to provide a coupling device which can release a charging connector for an electric car only when required.

A fourth object of the present invention is to provide a coupling device which can maintain in a temporary coupling position a charging connector assembly for an electric car.

A fifth object of the present invention is to provide a coupling device which can readily unite and detach a charging connector for an electric car.

A sixth object of the present invention is to provide a coupling device which can secure an operator from charging a battery in an electric car through a charging connector.

A seventh object of the present invention is to provide a coupling device which can readily handle a lever upon charging a battery in an electric car through a charging connector.

In order to achieve the above first through seventh objects, a coupling device of a charging connector assembly for an electric car in accordance with the present invention interconnects a car connector and a charger connector to charge a battery in the electric car.

The coupling device comprises: a gun type body having a barrel portion and a grip; an operation lever pivotably connected to said grip and biased by an elastic member toward a direction moving away from said grip; means for locking said operation lever at a closing position near said grip; gear means mounted on a proximal end of said barrel portion and engaging with an end of said operation lever; a front cover mounted on a distal end of said barrel portion for accommodating said charger connector; and coupling means mounted on said barrel portion movably along its longitudinal direction and having an end coupled to said gear means and the other end coupled to either one of both said connectors.

In order to achieve the first object of the present invention, in a coupling device of the present invention, said gear means include an intermediate gear and a pinion which engage with each other. Said intermediate gear is engaged with a sector gear provided on an end of said operation lever. Said pinion is engaged with a rack provided on an end of said coupling means. Said coupling means are provided on the other end with engaging means. Said coupling means are moved back toward the proximal end of said barrel portion, so that said engaging means engage with said car connector, when said operation lever is actuated to move to said closing position, thereby interconnecting both said connectors.

The gear means may include a pinion. The pinion engages with a sector gear provided on an end of said operation lever and a rack provided on an end of said coupling means. The other end of said coupling means is connected to said charger connector. Said charger connector is received slidably in said front cover. Said coupling means are moved forth toward the distal end of said barrel portion, when said operation lever is actuated to move said closing position, thereby interconnecting both said connectors.

In order to achieve the third and fifth objects of the present invention, in a coupling device of the present invention, said locking means include a member which detachably interconnects lower ends of said operation lever and grip. The member may be a retaining ring, a plunger, or a lock piece.

In order to achieve the fourth object, a coupling device further comprises a mechanism for temporarily and detachably coupling both said connectors.

In order to achieve the second and sixth objects of the present invention, a coupling device of the present invention further comprises means for starting electrical conduction when both of said connectors are completely coupled. Said starting means of electrical conduction may be a switch which is closed when said operation lever is moved to said closing position, or a switch member provided on a pushing portion of said operation lever for turning a charging circuit off only upon actuating said pushing portion.

In order to achieve the seventh object of the present invention, a coupling device of the present invention further comprises means for restraining said operation lever from moving to said closing position until both said connectors reach a given incomplete coupling position.

BRIEF DESCRIPTION OF THE DRAWINGS

FIG. 24 is a circuit diagram of a charging circuit.

DETAILED DESCRIPTION OF THE PREFERRED EMBODIMENTS

Figure 1:
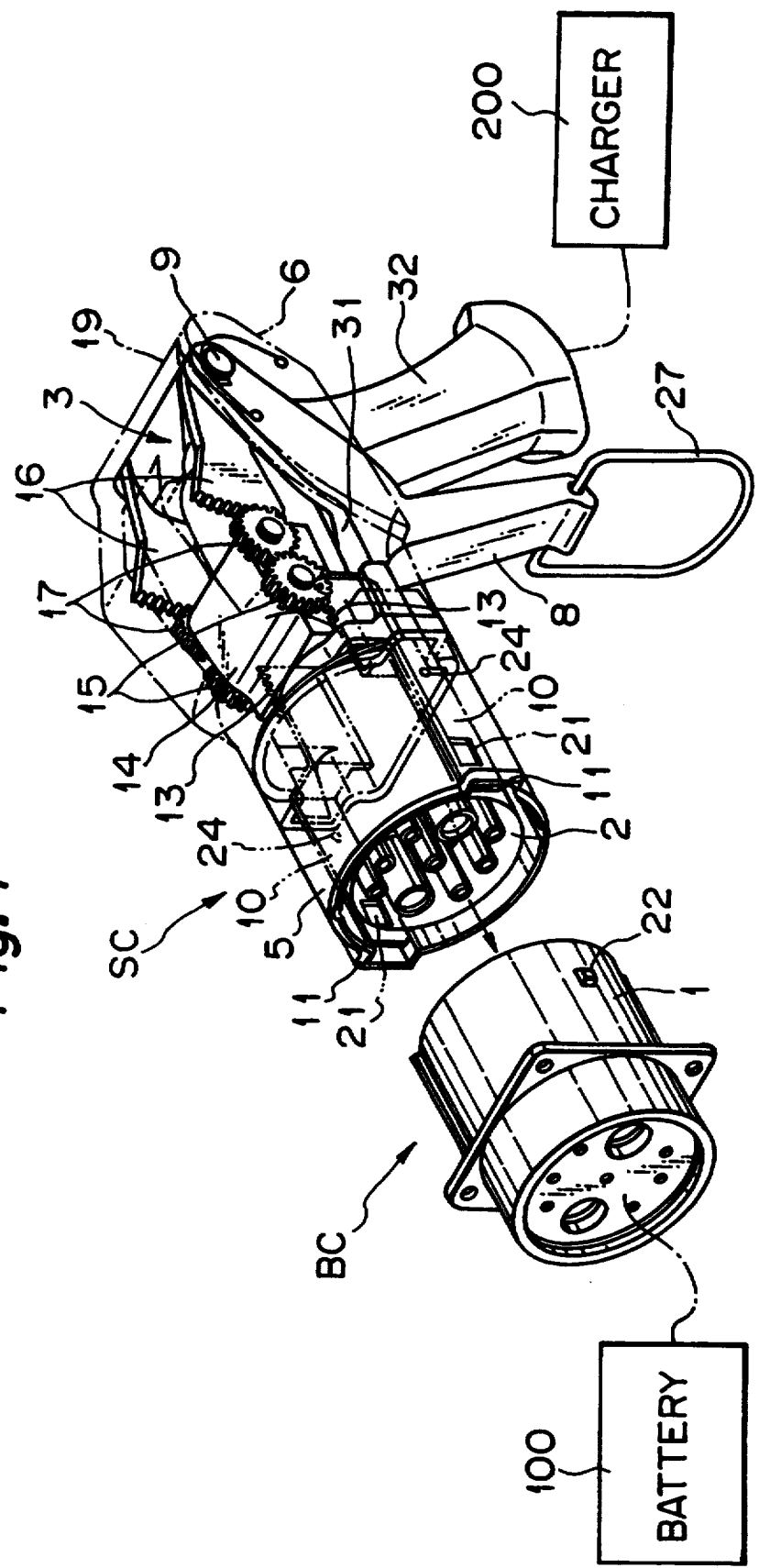
FIG. 1 is an exploded perspective view of a first embodiment of a coupling device in accordance with the present invention.

By referring now to the drawings, embodiments of a coupling device of a charging connector assembly for an electric car in accordance with the present invention will be explained below.

FIGS. 1 through 5 show a first embodiment of the coupling device of the present invention. In the drawings, a connector housing 1 of a car connector BC accommodates male terminals and the like connected to a battery 100 in an electric car and is secured to a given position in the car.

A connector housing 2 of a charger connector SC accommodates female terminals and the like connected to a charger 200 to act as a power source. The housing 2 is mounted in a front cover S attached to a barrel portion 81 of a gun type body 3 with a clearance being provided between the outer periphery of the housing 2 and the inner periphery of the front cover 5. When an operator holds a grip 32 of the body 3 and pushes the housing 2 onto the housing 1 along a guide in the front cover 5, both connectors BC and SC are disposed at a temporary coupling position by temporary engaging means (not shown).

A construction which completely interconnects both connectors will be explained below.

An operation lever 8 is rotatably attached to a grip 32 of the body 3 by an axis 9 to be held together with the grip 32. The lever 8 is biased by a torsion spring 6 so that the lever 8 is swung around the axis 9 in a direction leaving from the grip 32. The lever 8 is constrained from swinging over a given open angular position.

A pair of coupling plates 10 are inserted into a clearance between the connector housing 2 and the front cover 5 attached coaxially on an end of the barrel portion 31 of the body 3 so that the coupling plates 10 are arranged symmetrically on both sides of a longitudinal axis of the housing 2. The coupling plates 10 are bent so that a distance between them is equal to an outer diameter of the housing 1 at a front side and narrower than the diameter at a rear side. The coupling plates 10 can slide forwardly and backwardly along a guide 11 provided in the front cover 5 and are arranged so that a distance between the distal ends of the plates 10 is widened.

Figure 3A:
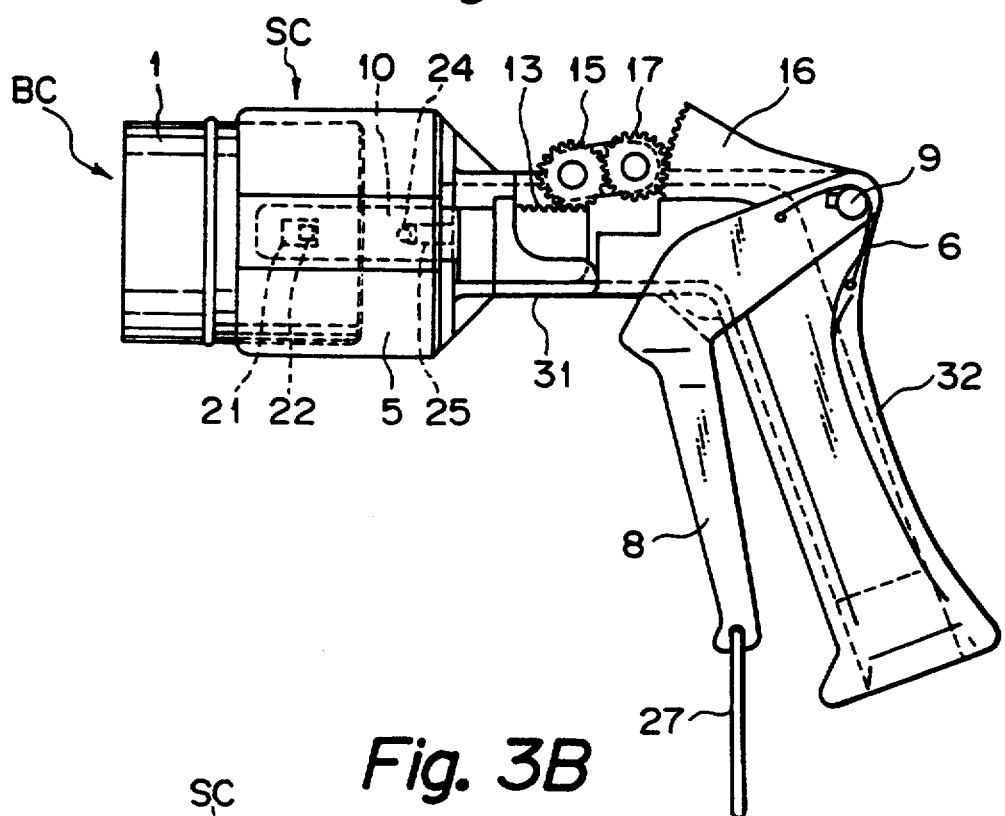
FIGS. 3A and 3B are side views similar to FIG. 2, illustrating a position (A) prior to completely coupling and a position, (B) after completely coupling.
Figure 3B:
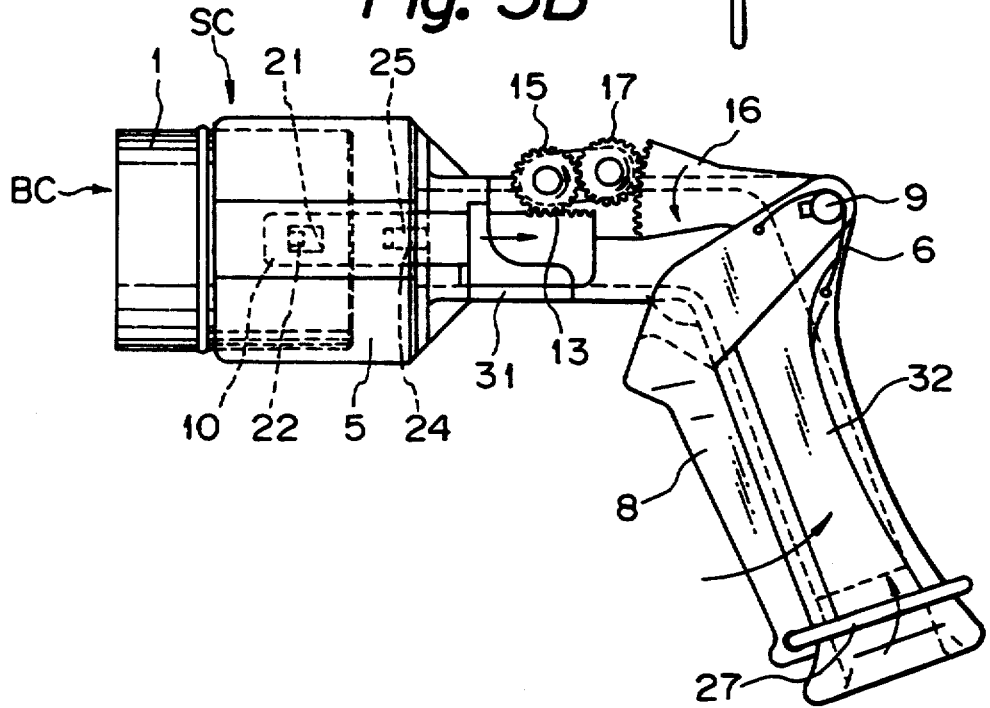
Figure 4:
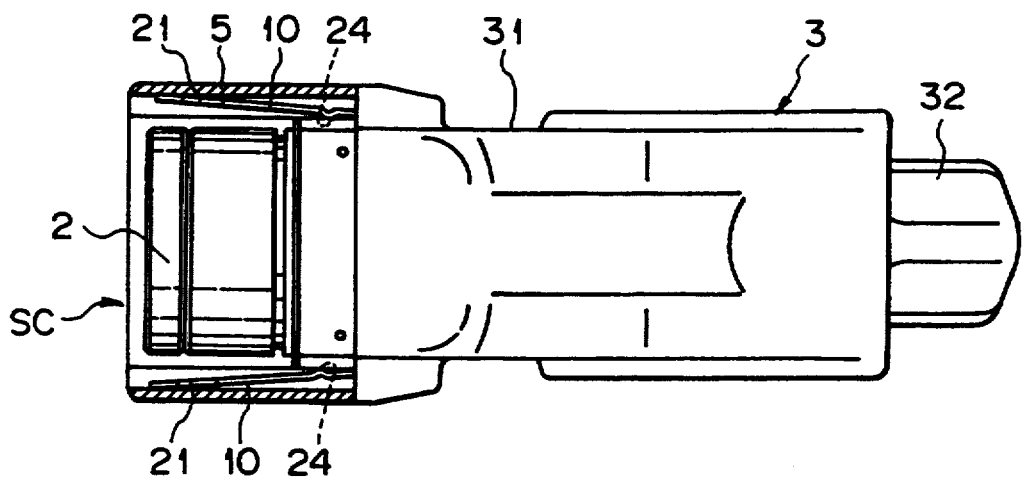
FIG. 4 is a plan view of the coupling device shown in FIG. 1, but partially removed away from a gun type body.

Each coupling plate 10 is provided on an upper face of its rear end with a rack 13, which meshes each of a pair of pinions 15 rotatably mounted on a support 14. Each pinion 15 meshes through an intermediate gear 17 each sector gear 16 provided on an end of the lever 8. When the lever 8 is turned about the axis 9 from its opening position to its closing position against a biasing force of the torsion spring 6, the sector gear 16 rotates about the axis 9 in the anticlockwise direction as shown in FIGS. 3A and 3B and the pinion 15 rotates through the intermediate gear 17 in the anticlockwise direction, thereby displacing the coupling plate 10 from an advanced position shown in FIG. 3A to a retracted position shown in FIG. 3B. When the lever 8 is returned from the closing position to the opening position by the biasing force, the sector gear 16 rotates in the clockwise direction and the pinion 15 rotates through the intermediate gear 17 in the clockwise direction, thereby displacing the coupling plate 10 from the retracted position shown in FIG. 3B to the advanced position shown in FIG. 3A.

The gear mechanism described above is protected by a cover 19 (see FIG. 1).

Each coupling plate 10 is provided in a distal end with a coupling window 21. The connector housing 1 of the car connector BC is provided on the right and left side of the outer periphery with projections 22 which are received in the coupling window 21 when the coupling plate 10 is disposed at the advanced position and both connectors BC and SC are disposed at the incomplete coupling position.

Figure 5:
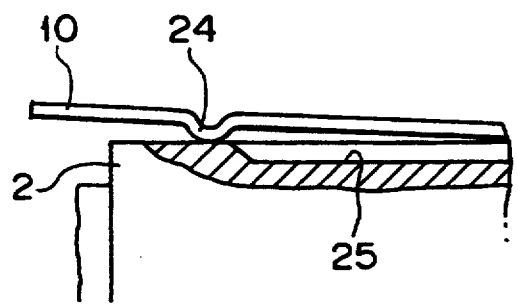
FIG. 5 is a fragmentary enlarged view of FIG. 4, illustrating an operation of a coupling plate.

As shown in FIG. 5, the coupling plate 10 is provided on the front side with an inwardly expanded projection 24 and the housing 2 of the charger connector SC is provided on an outer periphery of a rear side with an escape groove 25 in which the projection 24 is received. An end of the escape groove 25 is arranged at a position rearward from the projection 24 when the coupling plate 10 is at the advanced position and is formed into a ramp face. Accordingly, when the coupling plate 10 is at the advanced position, the projection 24 rides on the outer periphery of the housing 2 out of the escape groove 25 and the distance between the distal ends of the coupling plates 10 is forced to be widened, as shown in FIG. 5.

The operation lever 8 is provided on its lower end with a retaining ring 27 which is latched on a lower end of the grip 32 to serve as a locking means.

Next, an operation of the first embodiment will be explained below.

Figure 2:
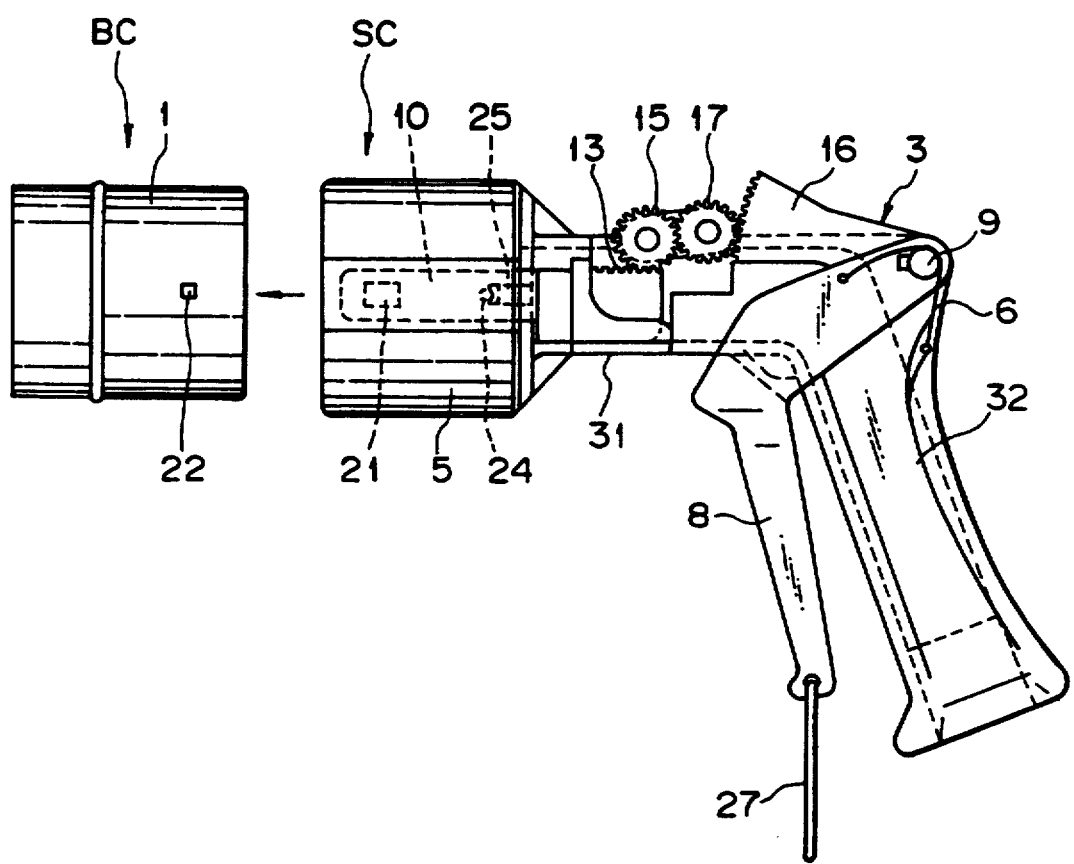
FIG. 2 is a side view of FIG. 1.

First, an operator holds the grip 32 of the body 3 without pulling the lever 8 and inserts the housing 2 of the charger connector SC into the housing 1 of the car connector BC in a direction shown by an arrow in FIG. 2 until the housing 2 reaches a given incomplete coupling position shown in FIG. 3A. At this time, since the distance between the distal ends of the coupling plates 10 is widened when the plates 10 is at the advanced position, the housing 1 is easily advanced in the housing 2 without contacting the projections 22 with the plates 10.

Then, when the operator pulls the lever 8 against a biasing force of the torsion spring 6, the sector gear 16 rotates in the anticlockwise direction, the pinion 1B rotates through the intermediate gear 17 in the same direction, and the coupling plate 10 is displaced through the rack 13 from the advanced position to the retracted position. At the first time, the projection 24 falls in the escape groove 25, so that the distal end of the plate 10 moves inwardly and the projection 22 on the housing 1 is received in the coupling window 21 in the plate 10.

The window 21 engages with the projection 22 at a front edge during successive retracting movement thereby pulling the housing 1 of the car connector BC. Since the car connector BC is secured to the car, the housing 2 together with the body 3 of the charger connector 2 is pulled relatively to the housing 1 of the car connector BC, thereby completely coupling both connectors BC and SC.

Then, the retaining ring 27 attached to the lower end of the lever 8 is latched on the lower end of the grip 32 to maintain the lever 8 in the closing position. Consequently, the connectors BC and SC are maintained at the complete coupling position and begin to charge.

When charging is finished, the retaining ring 27 is unlatched from the lever 8 and the lever 8 is returned to the opening position by the biasing force of the torsion spring 6. Then, the gears 16, 17 and 15 rotate in the opposite directions, the coupling plate 10 is displaced through the rack 13 from the retracted position to the advanced position, thereby pushing back the housing 2 together with the body 3 of the charger connector SC.

When the coupling plate 10 reaches a position near the advanced position, the projection 24 rides on the outer periphery of the housing 2 out of the escape groove 25 through the ramp face and the distal end of the plate 10 moves outwardly so that the coupling window 21 in the plate 10 detaches the projection 22 on the housing 1 of the car connector 1, thereby returning both connectors BC and SC. They are easily detached by pulling the body 3.

According to the first embodiment of the present invention, it is possible to positively interconnect both connectors by a small force by changing a lever motion by means of the grip 32 and lever 8 to a reciprocation motion of the coupling plate 10 through a gear train and by pulling the housing 1 of the car connector BC relative to the housing 2 of the charger connector SC.

Next, a second embodiment of the present invention will be explained by referring to FIGS. 6A and 6B.

In the second embodiment, a rear end of the housing 2 of the charger connector SC is slidably inserted into a guide cylinder 31 fitted in an inner part of the front cover 5. A pair of coupling plates 10a extending rearwardly along the barrel portion 31 of the body 3 are connected to the both sides on the outer periphery of the housing 2. A pinion 5 meshes a rack 13 provided on an upper face of a rear end of the coupling plate 10a and also directly meshes a sector gear 16 provided on an end of a lever 8 in the same manner as the first embodiment.

Figure 6A:
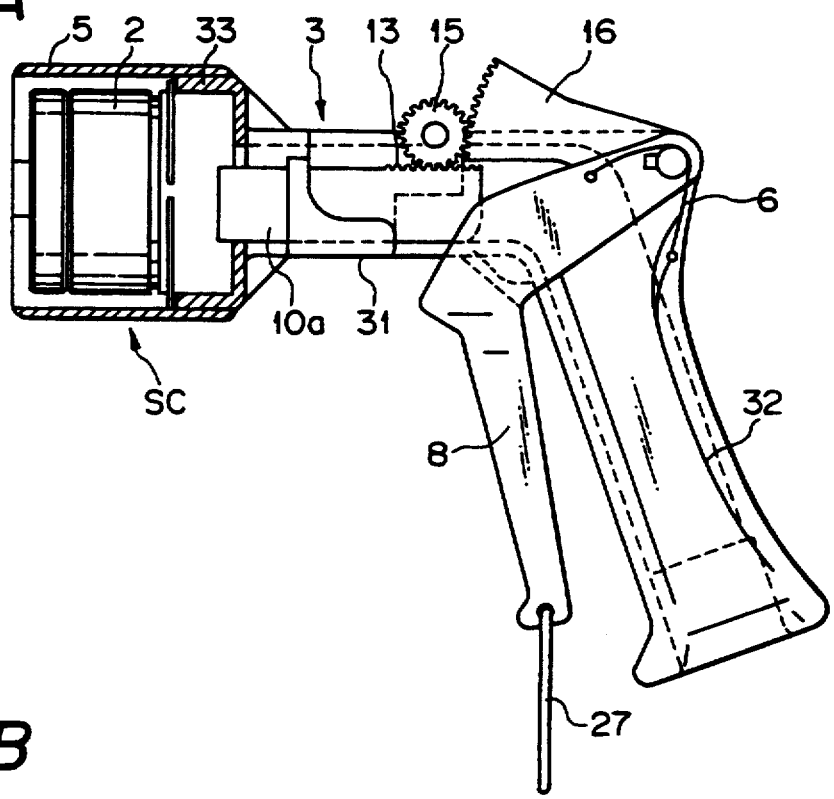
FIGS. 6A and 6B are side views of a second embodiment of the coupling device in accordance with the present invention, illustrating a position (A) at the starting of coupling and a position (B) at the finishing of coupling.
Figure 6B:
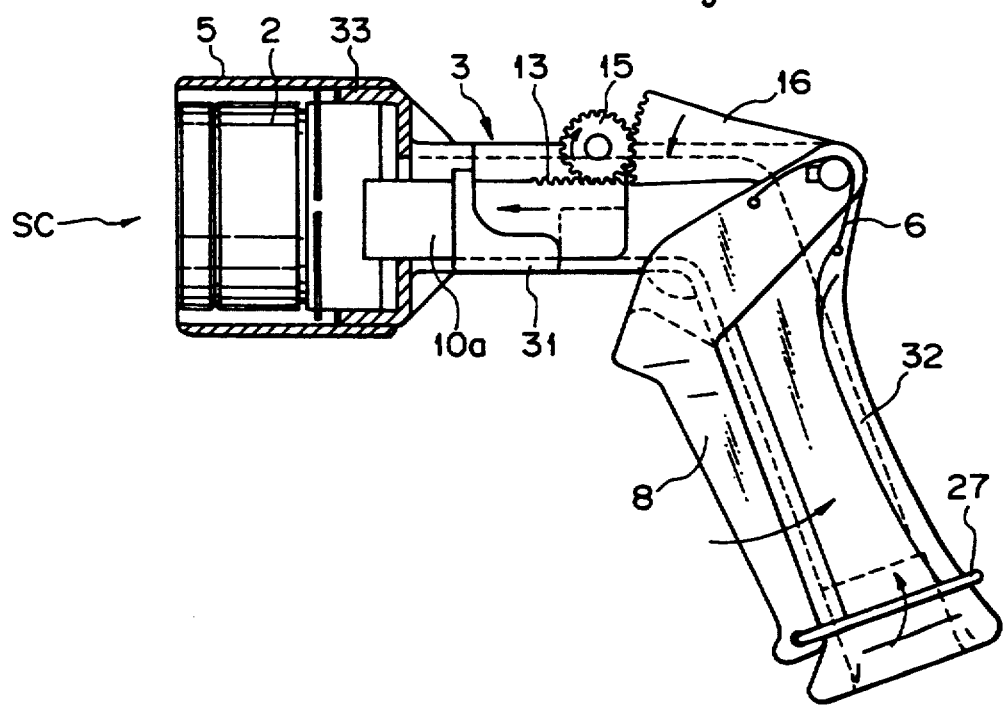

As shown in FIG. 6A, when the lever 8 is pulled after incompletely interconnecting both connectors BC and SC, the pinion 15 rotates in the clockwise direction, the coupling plate 10a moves through the rack 13 from a retracted position to an advanced position, and the housing 2 of the charger connector SC is pushed into the housing 1 of the car connectors BC, thereby completely interconnecting both connectors BC and SC, as shown in FIG. 6B. When the lever is released, the pinion rotates in the anticlockwise direction, the coupling plate 10a moves through the rack 13 from the advanced position to the retracted position, the housing 2 is pulled back and the housings 1 and 2 return to the incomplete coupling position. Both connectors BC and SC are disconnected by pulling the body 3.

It is possible in the second embodiment to positively interconnect both connectors under a small force by changing a lever motion by means of the lever 8 to a reciprocating motion of the coupling plate 10a and by pushing the housing 2 connected to the plate 10a into the housing 1.

Next, a third embodiment of the coupling device of the present invention will be explained by referring to FIGS. 7 through 9. The third embodiment utilizes a plunger as locking means for the operation lever.

Figure 7:
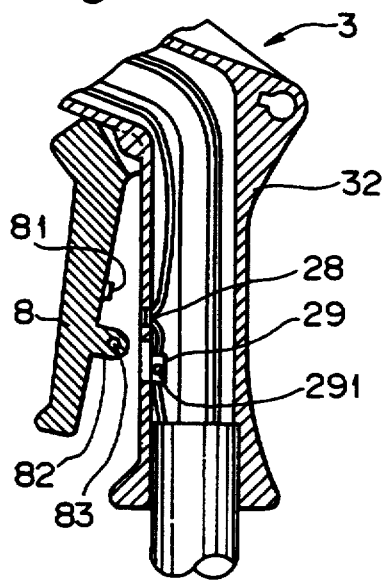
FIG. 7 is a fragmentary longitudinal sectional view of a third embodiment of the coupling device in accordance with the present invention.
Figure 8:
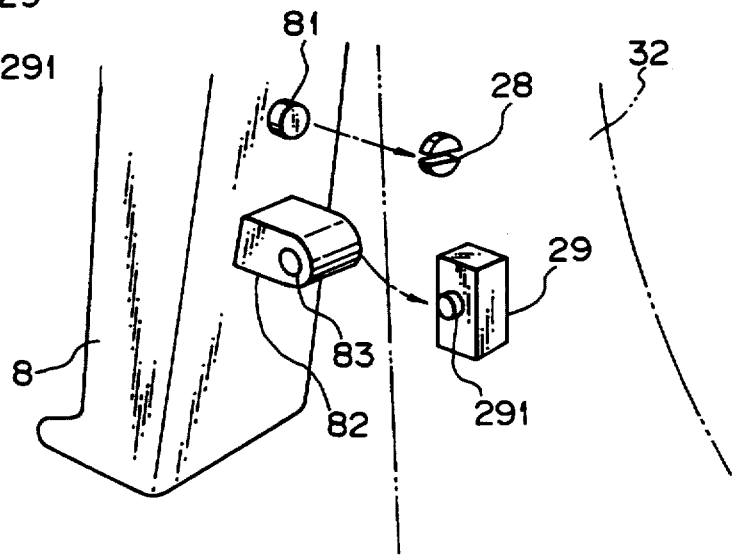
FIG. 8 is a perspective view of FIG. 7.

As shown in FIGS. 7 and 8, an operation lever 8 is provided with a switch pin 81 and an engaging block 82 having a hole 83 on an inner face opposing to a grip 32. The grip 32 is provided on an outer face opposing the lever 8 with openings corresponding to the pin 81 and block 82 when the lever 8 approaches the grip 32. A switch 28 is disposed in one opening and a solenoid 29 having a plunger 291 is disposed in the other opening. When the lever 8 approaches the grip 32, the pin 81 abuts on the switch 28 and the hole 83 receives the plunger 291.

Figure 9:
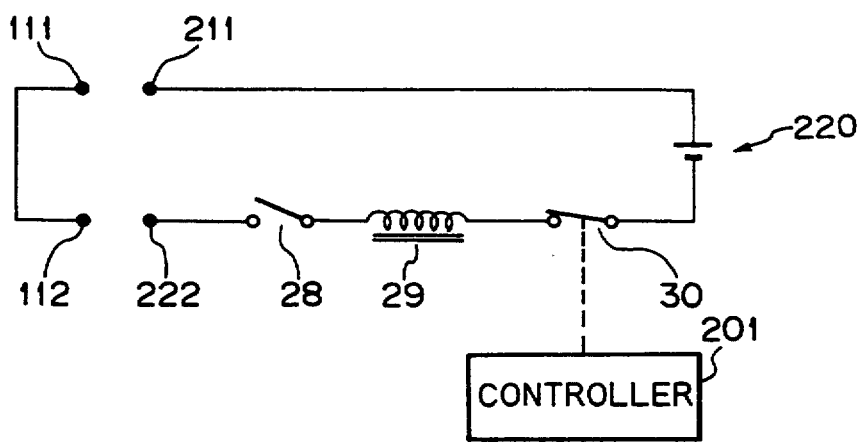
FIG. 9 is an electrical circuit of locking means shown in FIG. 7.
Figure 10:
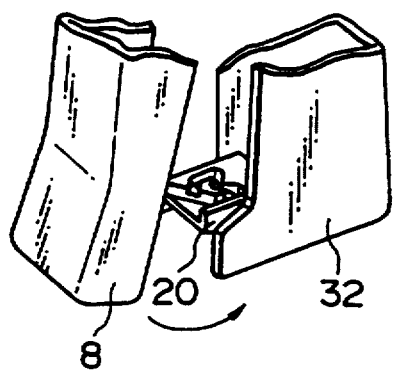
FIG. 10 is a fragmentary perspective view of a fourth embodiment of the coupling device in accordance with the present invention.

As shown in FIG. 9, the car connector BC has coupling-detection terminals 111 and 112 while the charger connector SC has coupling-detection terminals 211 and 212 adapted to be connected to the terminals 111 and 112, respectively. As shown in FIG. 9, a controlling circuit is constituted by the terminals 111, 112. 211 and 212, the switch 28, the solenoid 29, a switch 30 controlled by a controller 201, and a battery 220.

Some of terminals in the housing 1 of the car connector BC are power terminals connected to the battery 100 while some of the terminals in the housing 2 of the charger connector SC are power terminals connected to the charger 200 and adapted to supply a charging power to the battery 100. The switch 30 is turned to OFF by the controller 201 in response to a given voltage between the power terminals.

A locking means is constituted by the engaging block 82 and the plunger 291 of the solenoid 29. The plunger 291 is adapted to be inserted into the hole 83 in the engaging block 82. Further, a coupling-detection means is constituted by the switch pin 81 and the switch 28. When the pin 81 contacts with the switch 28, the solenoid 29 is energized. A conducting detection means is constituted by the controller 201, switch 30, and solenoid 29. When the controller 201 detects a given voltage between the power terminals, the switch is turned to OFF to shut a current to the solenoid 29.

The engaging block 82 and switch pin 81 enter into the respective openings to turn the switch to ON. Since the coupling-detection terminals 111 and 112 are connected to the coupling-detection terminals 211 and 212 when the respective terminals in the respective housings 1 and 2 are interconnected, the controlling circuit shown in FIG. 9 is completely closed to energize the solenoid 29. Then, the plunger projects to enter into the hole 83 in the block 82, thereby locking the lever 8 on the grip 32.

When the power terminals 111 and 112 are connected to the power terminals 211 and 212 to charge the battery 100, a voltage in the battery 100 is rising. When the charging voltage rises over a threshold value, the controller 201 turns the switch 30 to OFF. Then, since the controlling circuit shown in FIG. 9 is opened, the solenoid 29 is released and the plunger 291 comes out of the hole 83 in the engaging block 82 and returns into a body of the solenoid 29.

Next, a fourth embodiment of the coupling device of the present invention will be explained by referring to FIGS. 10 through 13. The fourth embodiment utilizes a lock piece for locking the operation lever on the grip.

Figure 11:
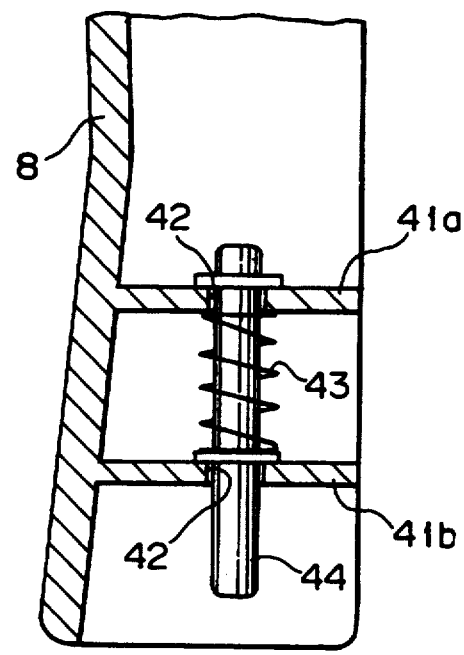
FIG. 11 is a fragmentary sectional view of an operation lever shown in FIG. 10.
Figure 12:
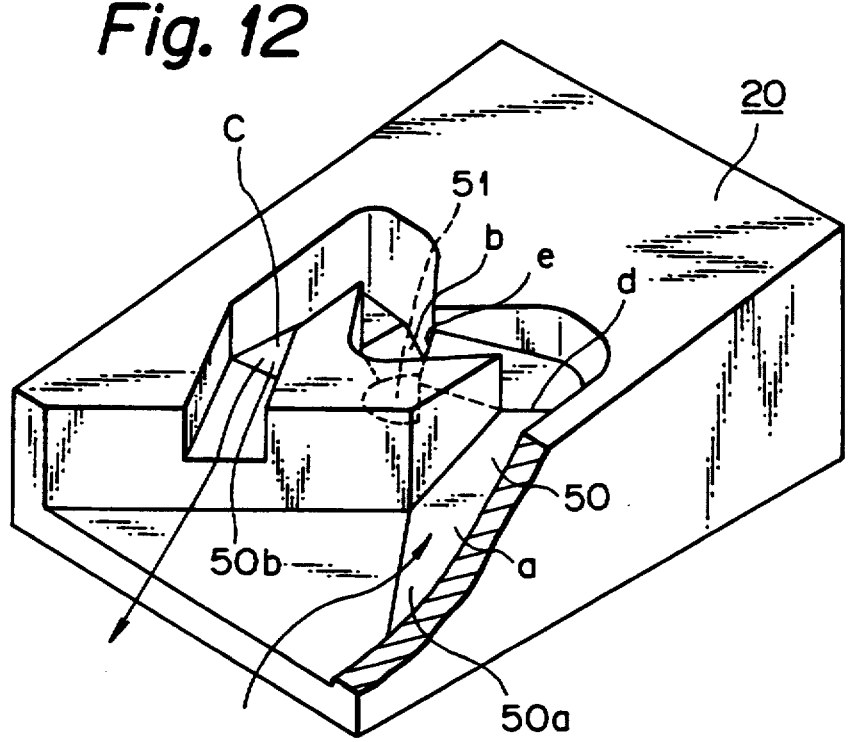
FIG. 12 is a perspective view of a lock piece.
Figure 13:
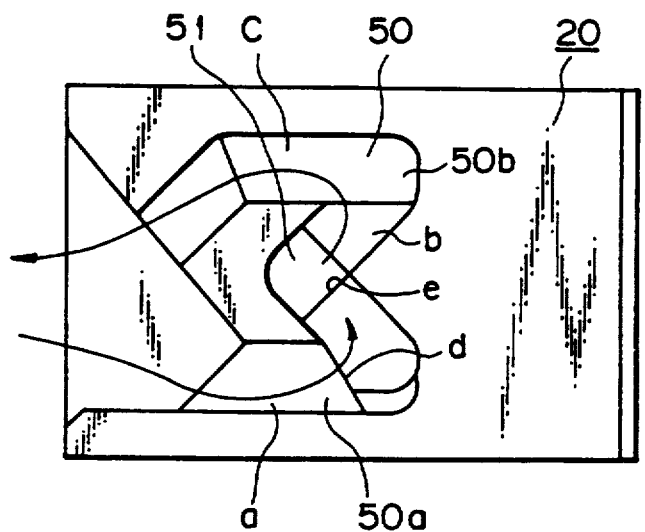
FIG. 13 is a plan view of FIG. 12.

A grip 32 is open at a front side and is provided on a bottom plate with a lock piece 20. As shown in FIGS. 11, 12 and 13, the lock piece 20 is provided with a guide groove 50 which guides an end of a stopper pin 44. The guide groove 50 has an inlet portion 50a which guides the stopper pin 44 upon a first pulling action of the operation lever 8 and an outlet portion 50b which guides the stopper pin 44 upon a second pulling action of the lever 8. A lock recess 51 which locks the stopper pin 44 is formed between the portions 50a and 50b. The guide groove 50 is provided on its bottom face with ramps a, b and c which guide the pin 44 smoothly and shoulders d and e which prevent the pin from returning.

When the grip 32 and operation lever 8 are grasped to effect the first pulling action, the stopper pin 44 attached to a lower end of the operation lever 8 is guided by the guide groove 50 in the lock piece 20 to move through the inlet portion 50a and engage with the lock recess 51. Even if the operator releases the operation lever 8, the lever 8 is maintained in the closing position, thereby maintaining both connectors in the complete coupling position to charge the battery.

When the lever 8 is actuated by the second pulling action after charging, the stopper pin 44 comes out of the lock recess 51. When the operator releases the lever 8, the lever 8 returns to the original opening position by the biasing force of the spring 6. Then, the stopper pin 44 disengages from the guide groove 50 through the outlet portion 50b.

It is possible in the fourth embodiment to displace the housings 1 and 2 of the car and charger connectors BC and SC from the incomplete coupling position to the complete coupling position merely by grasping the grip 32 and lever 8 and pulling the lever 8 to the grip 32 and to carry out such handling by one hand. It is also possible to readily carry out coupling and detaching since the second pulling action can return both connectors to the incomplete coupling position.

Next, a fifth embodiment of the present invention will be explained by referring to FIGS. 14A, 14B and 14C.

In the fifth embodiment, the coupling device of the present invention further comprises means for restraining an operation lever 8 from moving to the closing position until both connectors BC and SC reach a given incomplete coupling position.

Figure 14A:
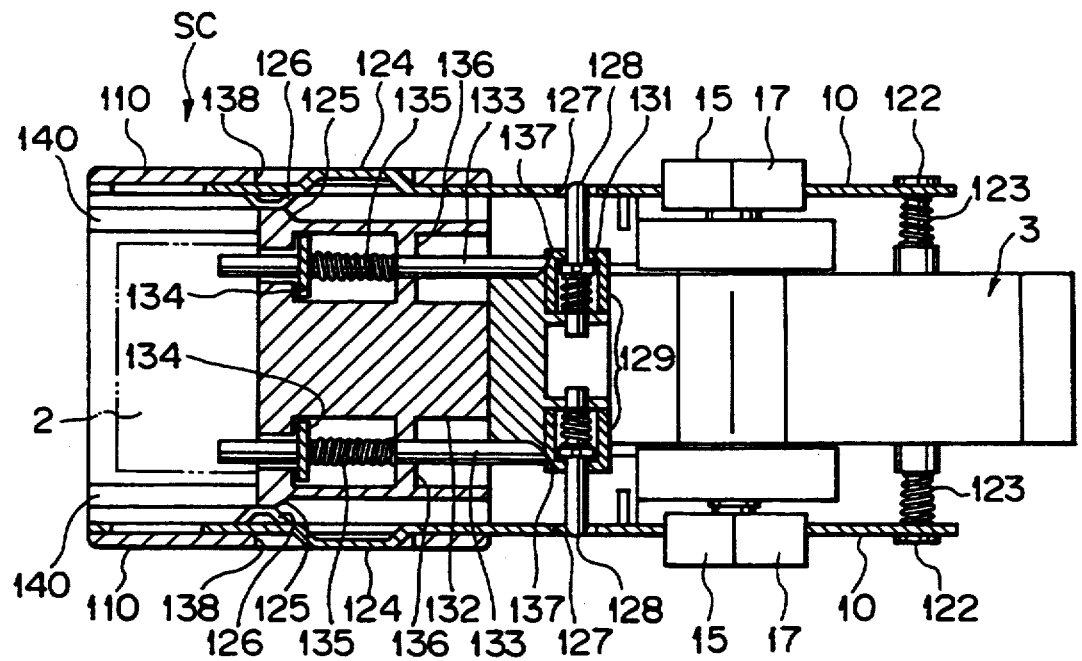
FIGS. 14A, 14B and 14C are fragmentary longitudinal sectional views of a fifth embodiment of the coupling device in accordance with the present invention, illustrating the respective positions (A), (B) and (C) prior to coupling, at incomplete coupling, and at complete coupling.

As shown in FIG. 14A, a coupling plate 10 is provided with a restraining hole 127 on a front end. A stopper pin 128 projects from a body 3 in opposition to the hole 127. The stopper pin 128 normally enters in the hole 127 to restrain the coupling plate 10 from sliding on the body 3. The stopper pin 128 is slidably received in an accommodating hole 129 and biased by a spring 130 to project outwardly. The stopper pin 128 is provided on a middle portion with a projection 131 a top end of which extends out of the hole 129.

On the other hand, a housing 2 of the charger connector SC is provided on an upper portion of a proximal end 132 with a pair of release pins 138 which serve to make the stopper pin 128 come out of the hole 127. The release pin 133 is mounted in the proximal end 132 slidably in the longitudinal direction of the housing 2 of the charger connector SC. A distal end of the release pin 133 is directed to a clearance between the housing 2 and the front cover 5, so that the pin 133 can be pushed by the front edge of the housing 1. A compression coil spring 135 is disposed on the pin 133 between a flange 134 and a partition 136. The spring 135 biases the pin 133 to project in the clearance between the front cover 5 and the housing 2. Further, a rear end of the release pin 133 extends to the projection 131 on the stopper pin 128 but in FIG. 14A the pins 131 and 128 are separated from each other. However, when the housing 2 of the charger connector SC is advanced to the incomplete coupling position relative to the housing 1 of the car connector BC, an inclined guide face 137 formed on the rear end of the release pin 133 abuts on the projection 131 so that the stopper pin 128 is forced to come out of the hole 127.

A rear cover 139 protects an upper and side rear half portion of the body 3.

Next, an operation and effects of the fifth embodiment will be explained below. After opening lids not shown, the housing 2 of the charger connector SC is pushed onto the housing 1 of the car connector SC. At this time, as described above, the stopper pin 128 is received in the hole 127 to restrain the coupling plate 10 from sliding. Consequently, since the lever 8 is maintained at a given open angle, the operation lever 8 is not closed even if an operator actuates it carelessly. Accordingly, both plates 10 are maintained in a widened position and do not interfere with the projections 22.

Figure 14B:
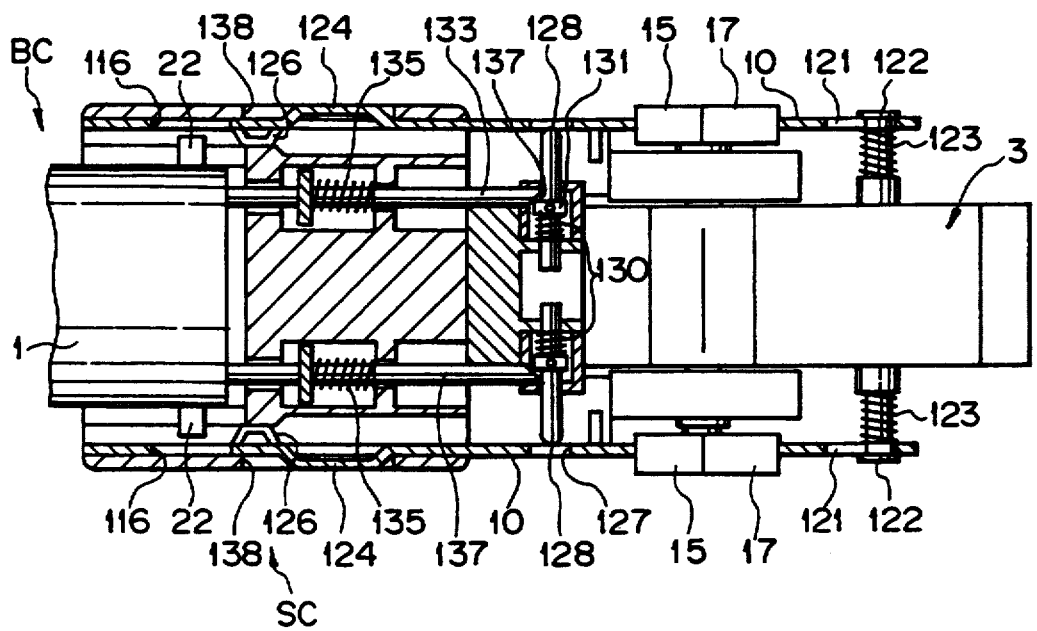
Figure 14C:
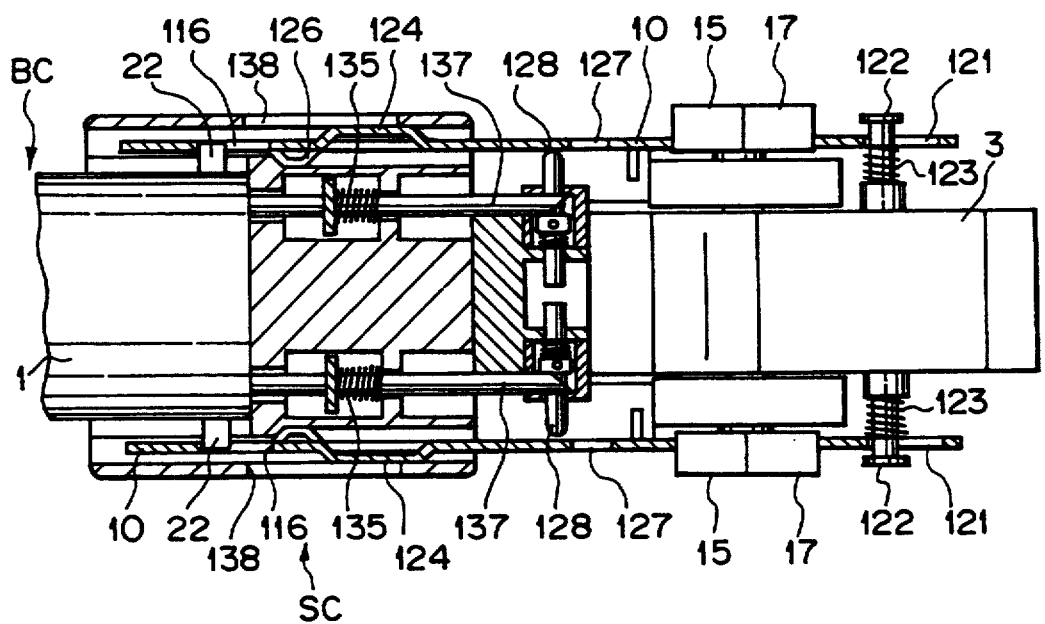

Thus, when the charger connector SC is pushed to the incomplete position shown in FIG. 14B relative to the car connector BC, the release pins 133 are pushed by the front edge of the housing 1 of the car connector BC against the compression coil spring 135. The guide face 137 of the release pin 133 abuts on the projection 131 on the stopper pin 128 to retract the stopper pin 128. Consequently, the stopper pin 128 comes out of the hole 127 and stays inside the coupling plate 10.

Then, when the lever 8 is grasped, the plate 10 receives a backward force. Since the plate 10 is released from the stopper pin 128 at this time, the plate 10 is retracted. At the front side of the plate 10, an outwardly bent portion 124 enters into an expanded portion 110 to engage the projection 22 with the window 118 (see FIG. 14C). If the lever 8 is further actuated, the plate 10 is further retracted. Since a pulling force is applied to the car connector BC, the charger connector SC is pushed to the car connector by a reaction force. Finally, both connectors BC and SC are brought into the complete coupling position. The lever 8 is maintained in this state and the charging work is continued.

When finishing the charging work, the lever 8 is released to return its opening position by the torsion spring 8. When the charger connector SC is pulled, it removes from the car connector BC.

According to the fifth embodiment, since the gripping process is constrained before the charger connector SC is pushed to the incomplete coupling position, the projections 22 on the housing 1 enter into the window 116 in the plate 10. Accordingly, it is possible to prevent the coupling operation from being repeated. Also, locking of the lever 8 makes it easy to apply a coupling force to the car connector BC.

Although a pair of stopper pins and a pair of release pins are provided in this embodiment, a single stopper pin and a single release pin may be provided.

Figure 15A:
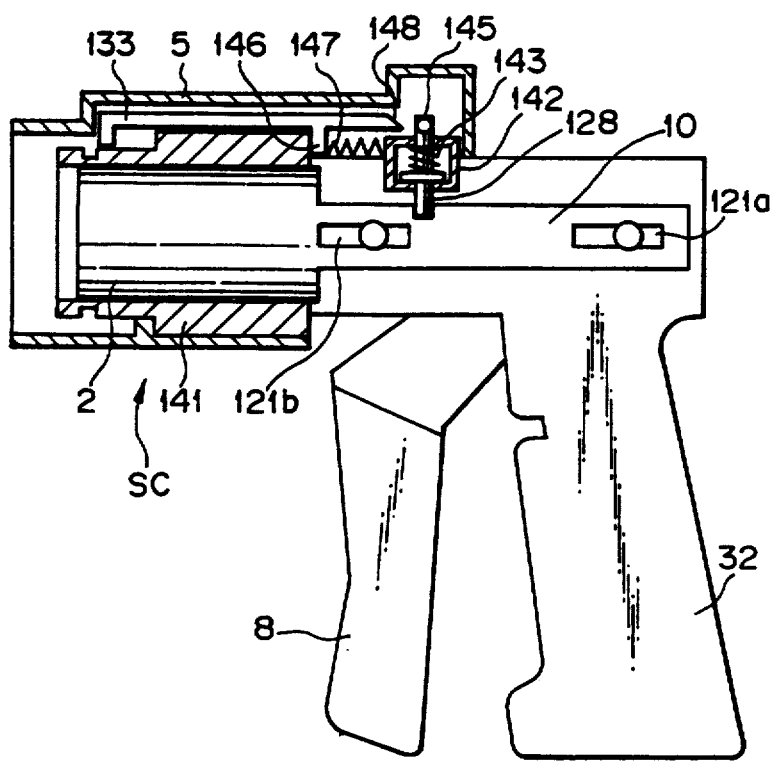
FIGS. 15A and 15B are fragmentary longitudinal sectional views of a sixth embodiment of the coupling device in accordance with the present invention, illustrating the respective positions (A) and (B) prior to coupling and at incomplete coupling.
Figure 15B:
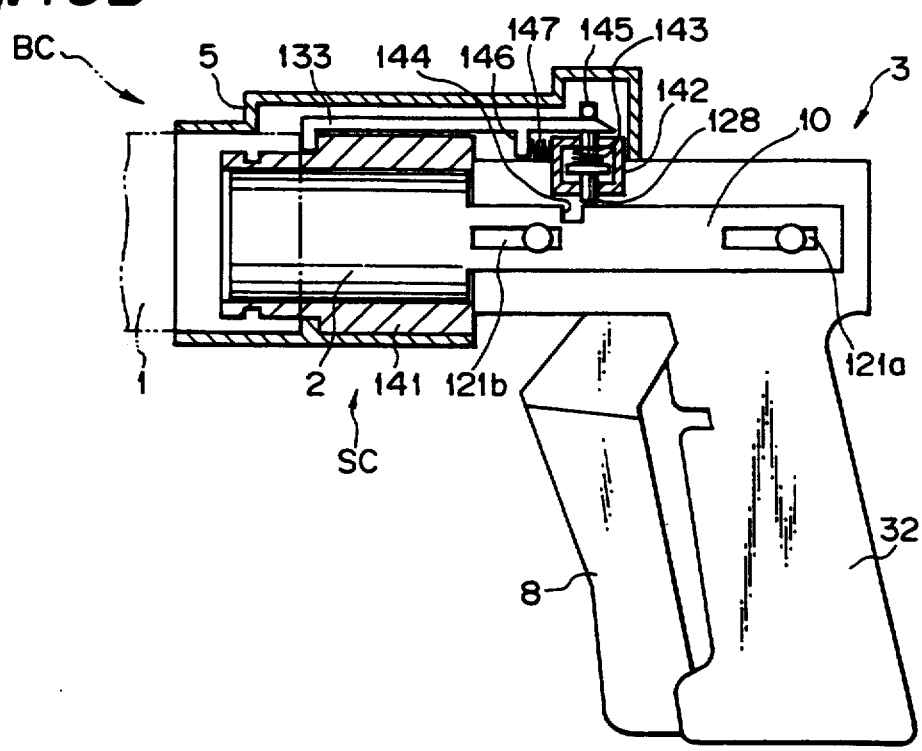

Next, a sixth embodiment of the coupling device of this invention will be described below by referring now to FIGS. 15A and 15B. In this embodiment, another restraining means for an operational lever 8 is provided. In the sixth embodiment, a housing 2 of the charger connector SC is movably mounted in a guide cylinder 141 disposed in a front cover 5. A coupling plate 10 is secured to the housing 2. The coupling plate 10 is provided on front and rear ends with slits 121a and 121b, respectively. A pin 122 having a head is movably inserted in the slits 121a and 121b. When the lever 8 is grasped, the coupling plate 10 is advanced to completely interconnect the connectors BC and SC.

The body 3 is provided above the lever 8 with a pin casing 142 for accommodating a stopper pin 128. The stopper pin 128 can move up and down in the casing 142 and is biased downwardly by a spring 143. A lower end of the stopper pin 128 projects out of the pin casing 142 to normally engage with a notch 144 formed in an upper edge of the coupling plate 10, thereby restraining the lever 8 from being handled. Further, an upper end of the stopper pin 128 projects from the pin casing 128 and is provided with a latch piece 145 extending outwardly (vertically on the drawing).

On the other hand, a release pin 133 for the stopper pin 128 is disposed in an upper position in the front cover 5. The release pin 133 is moved forwardly and backwardly by means of a guide not shown. A front end of the release pin 133 is bent and directed to a clearance between the front cover 5 and the guide cylinder 141. The front end is adapted to be pushed by the front edge of the housing 1 of the car connector BC. A spring-bearing leg 146 projects on an intermediate position on the release pin 133. The release pin 133 is biased forwardly by a compression coil spring 147 disposed between the leg 46 and the pin casing 142 so that the leg 146 is normally pushed to the rear end of the guide cylinder 141. The release pin 133 is provided on a rear end with an inclined face 148 which is normally separated away from the stopper pin 128. When the housing 2 of the charger connector SC is inserted into the housing 1 of the car connector 1 by a given depth, the rear end of the release pin 133 engages with the latch piece 145 to rise it, thereby enabling the plate 10 to be released from the stopper pin 128.

Another construction as well as the locking means which maintains the lever at the closing position is the same as that of the fifth embodiment.

Next, an operation and effects of the sixth embodiment will be explained below. The stopper pin 128 engages with the notch 144 in the coupling plate 10 to restrain the plate 10 from sliding until the housing 2 of the charger connector SC is inserted into the housing 1 of the car connector BC by the given depth. Consequently, the lever 8 is constrained from moving to the closing position. When the connectors BC and SC are brought into the given coupling position, the front edge of the housing 1 pushes the release pins 133 to raise the stopper pins 128 so that the stopper pins 128 come out of the notch 144. Then, when the lever 8 is actuated to the closing position, the coupling plate 10 is advanced and the connectors SC and BC are completely interconnected.

When the lever 8 is returned to the opening position after charging, the coupling plate 10 is retracted from the advanced position and the charger connector SC is also retracted, thereby bringing the connectors BC and SC to the intermediate coupling position. If the charger connector SC is pulled from this position, it is detached from the car connector BC.

It is possible in the sixth embodiment to smoothly carry out the coupling operation, since the lever 8 is restrained from turning before the connectors BC and SC are brought into the intermediate position and the aiding mechanism for coupling is actuated upon the given incomplete coupling state, that is, only upon a regular period.

Although the stopper pin 128 engages with the plate 10 in this embodiment, the stopper pin may directly engage with the lever 8.

Figure 16:
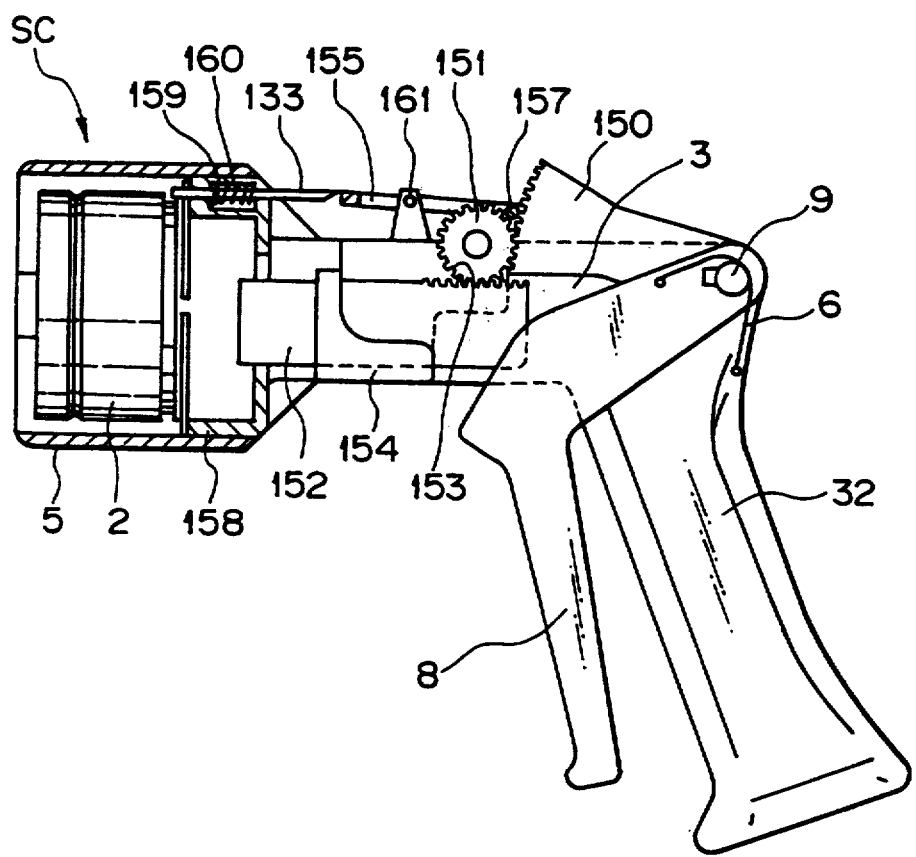
FIG. 16 is a fragmentary longitudinal sectional views of a seventh embodiment of the coupling device in accordance with the present invention.

Next, a seventh embodiment of the coupling device of the present invention will be explained by referring to FIG. 16. In this embodiment, still another restraining mechanism for an operational lever 8 is provided.

A U-shaped stopper piece 155 is rotatably supported on an upper face of a body 3 by a support 156. A stopper shaft 157 is bridged between two legs of the stopper piece 155. The stopper shaft 157 detachably engages with a sector gear 150 and a pinion 151. A torsion spring not shown in mounted on a support shaft 161 of the stopper piece 155 so that the stopper shaft 157 is biased to engage with the gears 150 and 151. On the other hand, an accommodating chamber 159 which accommodates a release pin 133 for a stopper piece 155 is provided in an inner wall of a guide cylinder 158. The release pin slidably passes through the chamber 159 and is biased forwardly by a spring 160 received in the chamber 159. A distal end of the release pin 133 extends to a clearance between the housing 2 and the front cover 5. When the housing 2 of the charger connector SC is coupled to the housing 1 of the car connector BC by a given depth, the release pin 133 is pushed by the front edge of the housing 1. A rear end of the release pin 133 extends to the stopper piece 155. The rear end of the pin 133 is separated from the stopper piece 155 normally, but an inclined face of an end of the pin 133 pushes down the stopper piece 155 when the charger connector SC is pushed to the car connector BC to retract the release pin 133, thereby disengaging the stopper shaft 57 from the gears 150 and 151.

In the seventh embodiment, since the stopper shaft 157 engages with the gears 150,151 before the charger connector SC is coupled to the car connector by the given depth, the lever 8 is constrained from actuating. When the connectors BC and SC are bought into the given coupling position, the release pin 133 is pushed backwardly by the front edge of the housing 1 of the car connector BC to swing the stopper piece 155. Thus, the stopper shaft 157 disengages from the gears 150 and 151. Thereafter, when the lever 8 is actuated, the coupling plate 152 is advanced by engagement of the sector gear 150, pinion 151, rack 153 and the charger connector SC is pushed onto the car connector BC to interconnect the connectors BC and SC completely.

Next, an eighth embodiment of the coupling device of the present invention will be described below by referring to FIGS. 17, 18A and 18B. The eighth embodiment further comprises a mechanism for detachably and temporarily interconnects both connectors BC and SC.

Figure 17:
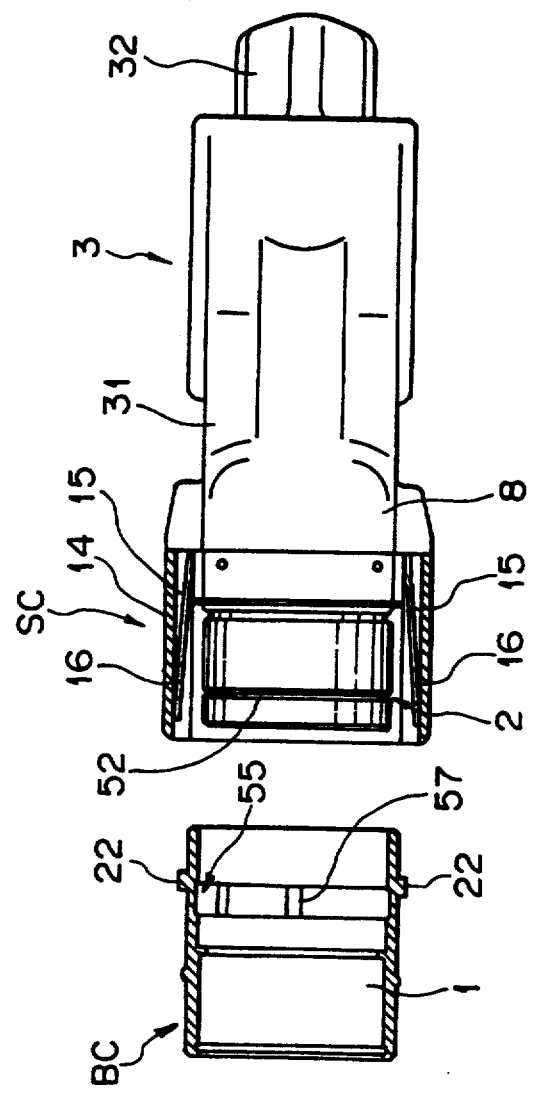
FIG. 17 is an exploded plan view of an eighth embodiment of the coupling device in accordance with the present invention.

A metal retaining ring 55 which serves to maintain the charger connector SC in a temporary coupling position is provided at a given depth from an open end on an interior of the housing 1 of the car charger BC, as shown in FIG. 17. As shown in FIGS. 18A and 18B, the ring 55 is fitted in an annular recess 56 formed in the interior of the housing 1. The ring 55 is provided with four retaining pawls 57 disposed at an equiangular distance. The retaining pawl 57 is provided with a slit extending in a coupling direction of the charger connector SC (one end of the slit reaches an edge of the pawl 57) and a rib projecting inwardly in the diametrical direction. The rib can be deformed outwardly in the diametrical direction.

The housing 2 of the charger connector SC is provided on an exterior with a groove 52 which detachably receives the pawls 57 on the car connector BC. When the pawls 57 engage with the groove 52, the charger connector SC is held in the car connector BC by a clamping force enough to prevent the connector SC from falling down. As shown in FIG. 18A, when the pawls 57 engage with the groove 52 a window 21 in a coupling plate 10 receives projections 22 on the car connector BC. An engagement of the pawls 57 and groove 52 acts as a positioning means for restricting a depth of inserting the plate 10.

As shown in FIG. 17, the distance between the distal ends of the plates is widened normally so that the plates 10 interfere with the projections 22 when the charger connector SC is pushed to the temporary coupling position. However, when the lever 8 is grasped at the temporary coupling position, the plates 10 are slightly retracted, thereby enabling the coupling operation to be carried out.

Figure 18A:
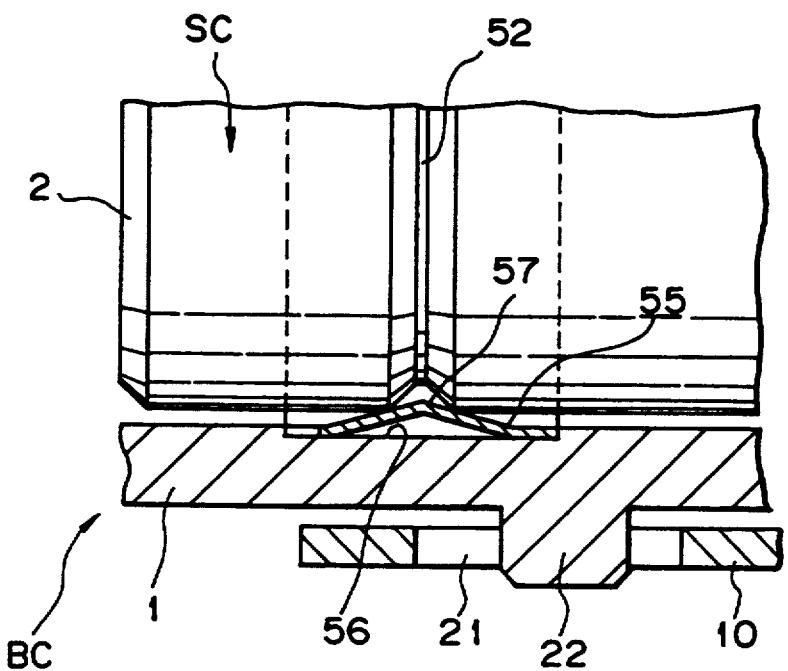
FIGS. 18A and 18B are fragmentary enlarged views shown in FIG. 17, illustrating a position (A) at temporarily coupling and a position (B) at completely coupling.
Figure 18B:
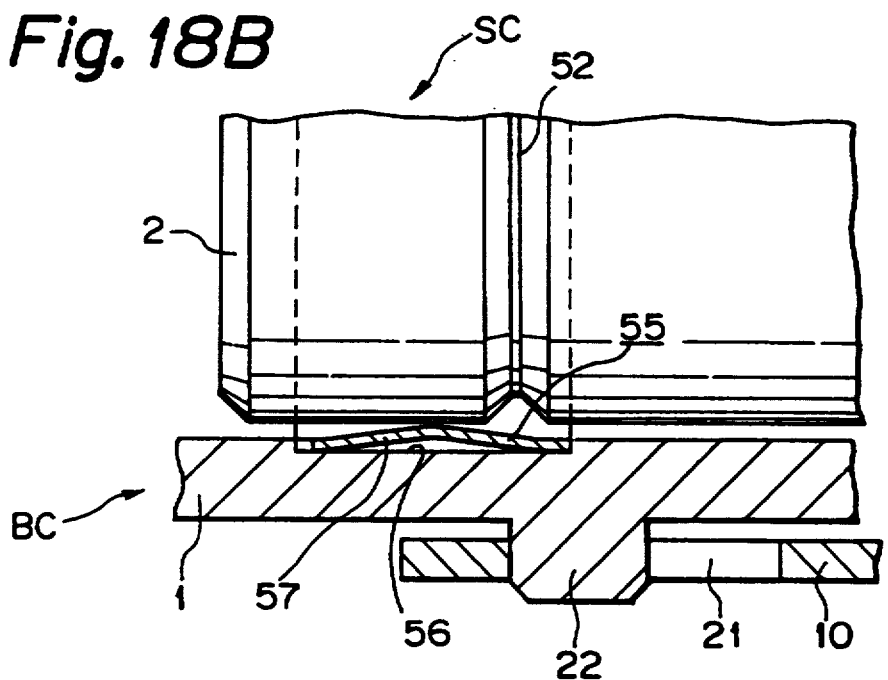

The charger connector SC is held in the temporary coupling position by engagement of the pawls 57 and groove 52 (see FIG. 18A).

Since the charger connector SC is maintained in the temporary coupling position in this embodiment, it is not necessary to continue to apply a pushing force (coupling force) to the lever 8 until the charger connector SC is displaced to the complete coupling position (FIG. 18B) and thus coupling operation becomes easier. It is also possible to avoid an accident in which the charger connector SC falls from the car connector in the temporary coupling position and is broken. It is possible to handle the lever without any error and enhance charging work since the timing of grasping the lever is limited.

Figure 19A:
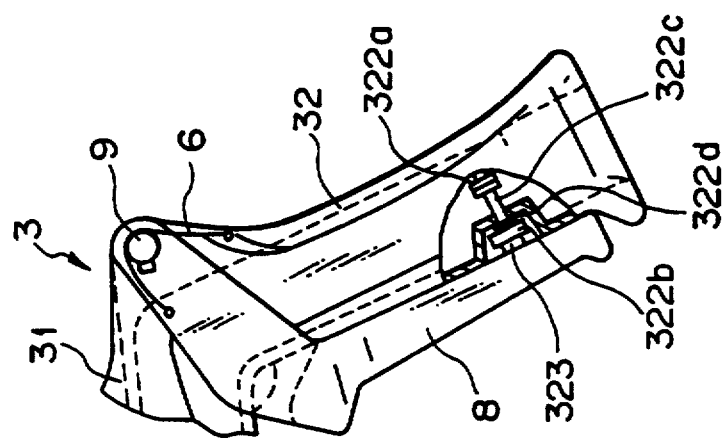
FIGS. 19A and 19B are fragmentary side views of a ninth embodiment of the coupling device in accordance with the present invention.
Figure 19B:
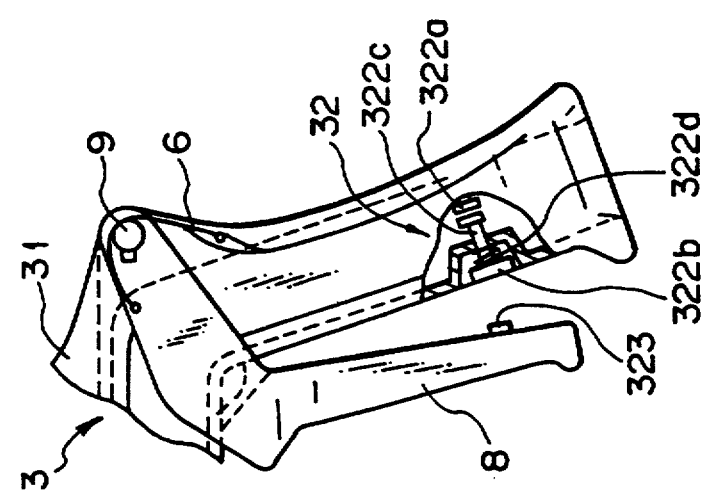

Next, a ninth embodiment of the coupling device of the present invention will be described below by referring to FIGS. 19A, 19B and 20. This embodiment further comprises means for commencing conduction upon completely interconnecting both connectors BC and SC.

Figure 20:
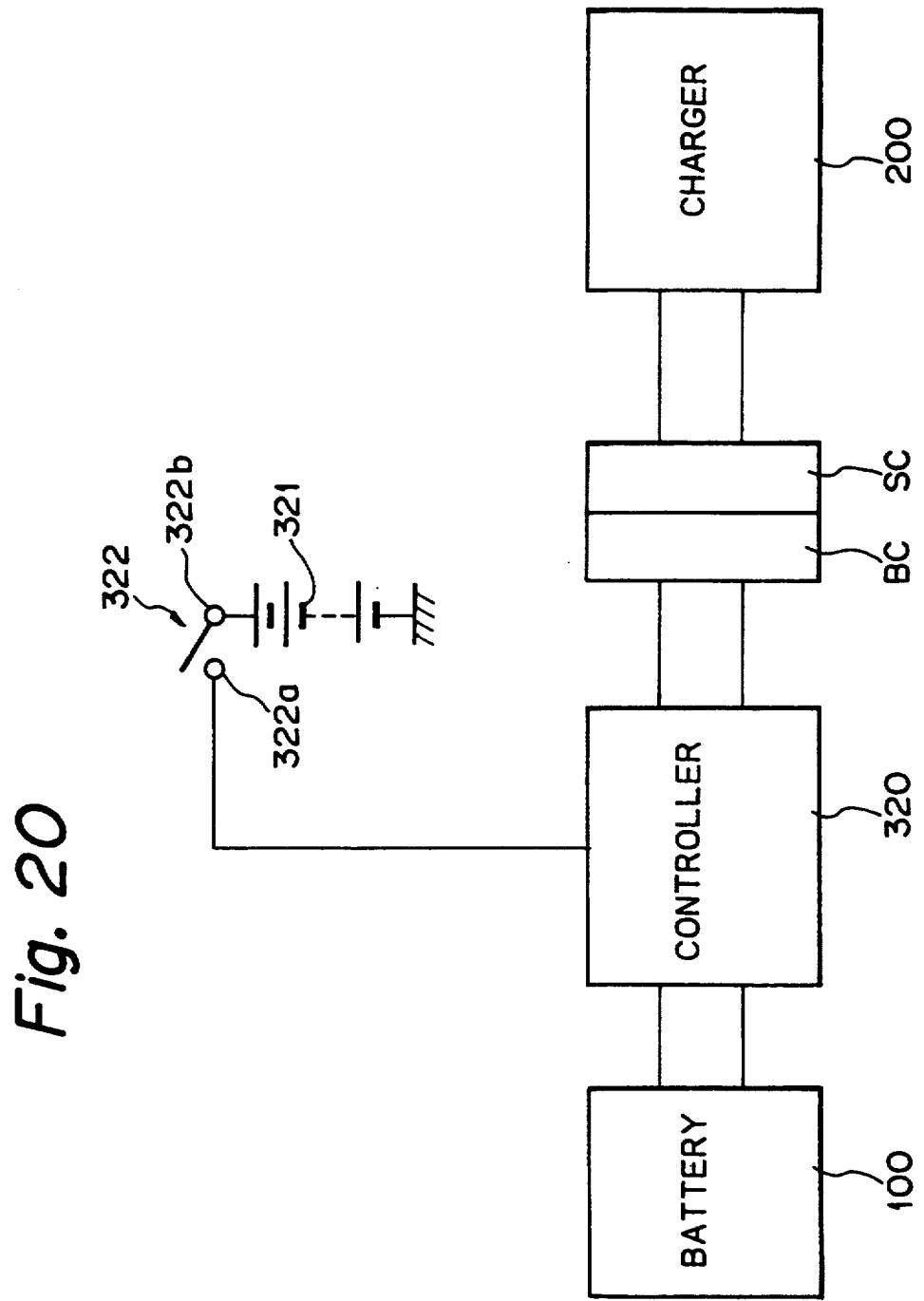
FIG. 20 is a circuit diagram of a charging circuit shown in FIGS. 19A and 19B.

As shown in FIG. 20, a controller 320 (for example, a relay circuit) is provided between the car connector BC and the battery 100 in the car. A switch 322 which sends a signal to the controller 320 is provided on the grip 32 between the controller 320 and a supply power source 321. The switch 322 includes a stationary contact 322a and a movable contact 322b opposing to an inner face of the lever 8. The movable contact 322b is biased outwardly by a compression coil spring 322d wound on an axis 322c to separate from the stationary contact 322a normally. The movable contact 322b contacts with the stationary contact 322a only when the lever 8 is grasped to the closing position. In this embodiment, a projection 323 is provided on the inner face of the lever 8 to readily press the movable contact 322b.

When the lever 8 is grasped to the closing position, the connectors BC and SC are brought into the complete coupling position in which terminals are interconnected regularly. Upon the complete coupling position, the projection 823 on the lever 8 presses the movable contact 822b to contact with the stationary contact 822a, thereby closing the switch 322. The switch outputs a signal to the controller 320, which closes the charging circuit to flow a current From the charger 200 to the battery 100.

In this embodiment, the charging circuit is closed to be able to be charged after completely coupling the connectors BC and SC and the connectors in the incomplete coupling position is constrained From charging. Accordingly, it is possible to prevent occurrence of abnormal heat and sparks and to carry out a safe charging work.

Next, a tenth embodiment of the coupling device of the present invention will be described below by referring to FIGS. 21 to 24. This embodiment Further comprises means For commencing conduction and having a switch member 622 which is provided on a gripping portion of an operation lever 8 and shuts off a charging circuit only when the switch member 622 is actuated.

Figure 23A:
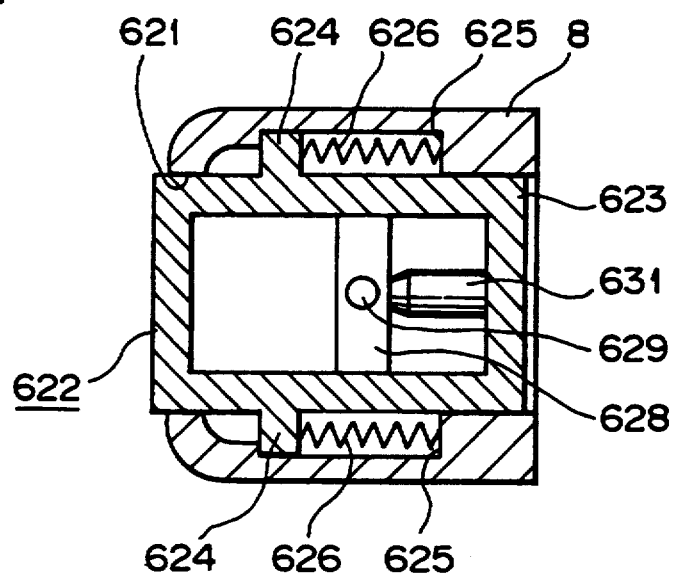
FIGS. 23A and 23B are fragmentary plan sectional views corresponding to FIGS. 22A and 22B, illustrating an ON-position (A) and another switch and an OFF-position (B) of the switch.
Figure 23B:
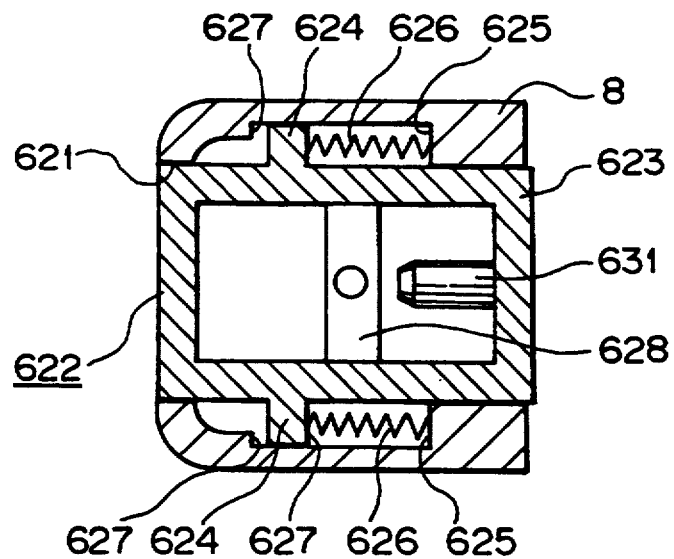

As shown in FIGS. 23A and 23B, a lever 8 is formed into a U-shaped cross section. The lever 8 is provided on a front side with an opening 821 which receives the switch member 622. The switch member 622 is formed into a box which is open at up and down sides. The box 628 is provided on opposite sides with projections 624. A compression coil spring 626 is disposed between the projection 824 and a shoulder 628 on a rear side of the lever 8. The switch member 622 is normally biased to a front side shoulder by the spring 628.

Figure 21:
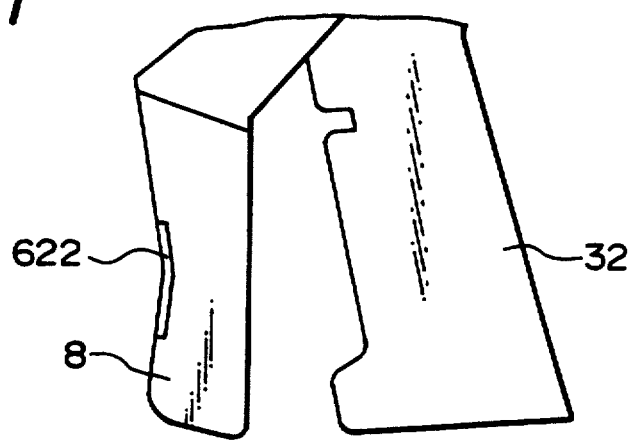
FIG. 21 is a fragmentary side view of a tenth embodiment of the coupling device in accordance with the present invention.
Figure 22A:
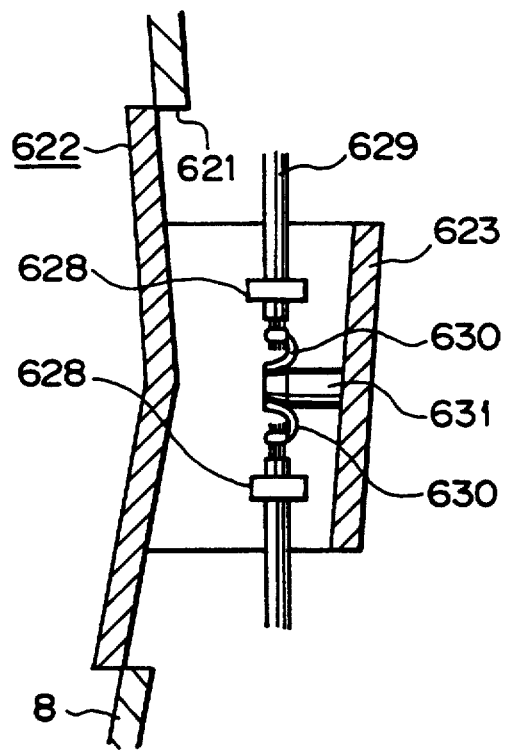
FIGS. 22A and 22B are fragmentary side sectional views; illustrating an ON-position (A) of a switch and an OFF-position (B) of the switch.
Figure 22B:
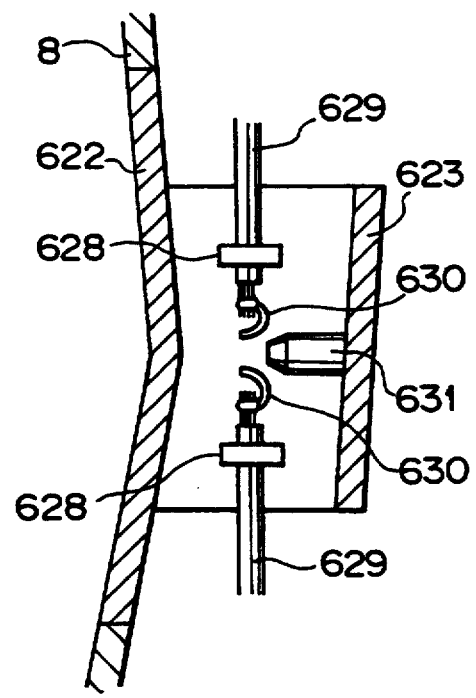

As shown in FIGS. 21, 22A and 22B, support bars 828 are bridged at upper and lower positions in the box. The support bar 628 support an end of a circuit terminal cord 629 (preferably having flexibility). The ends of the circuit terminal cords 629 are connected to stationary spring contacts 630 which are spaced away from each other by a given distance. The box 628 is provided on an inner wall with the movable contact 631 which is directed to the stationary contacts 630. In such switch means constructed above, the movable contact 631 is normally pushed between the stationary contacts 630 to close the switch means. When the switch member 622 is pushed to retract the movable contact 631, the movable contact 631 leaves from the stationary contacts 630 to open the switch means.

FIG. 24 shows a charging circuit for the battery 100 in the car. A controller 632 (for example, a relay circuit) is arranged between the charger connector SC and the charger 200. The switch means sends an on-off signal to the controller 632 through a supply power source 635. When the switch means is closed, the controller 632 permits the charging circuit to pass the charging current. When the switch circuit is opened, the controller 632 inhibits the charging circuit to pass the charging current.

When the grip 32 and lever 8 on the charger connector side are grasped to start charging, the movable contact leaves from the stationary contacts 631. Consequently, the switch member 622 is depressed so long as the operator holds the charger connector SC. Even if any failure of insulation should occur in the charger connector SC, the operator is not to subject to an electrical shock and he can work safely.

When the operator lets loose his hand from the charger connector, the switch member 622 returns to the original position by means of the spring 626 so that the movable contact 631 is pushed between the stationary contacts 630. Since the contacts 630 are connected through the contact 631, the controller 632 closes the charging circuit to make it a conduction state. Thus, the battery 100 in the car is charged through the coupled connector BC and SC from the charger 200.

What is claimed is:

1. A coupling device of a charging connector assembly for an electric car, wherein a car connector and a charger connector are interconnected to charge a battery in the electric car, comprising:

a body having a barrel portion and a grip;

an operation lever pivotably connected to said grip and biased by an elastic member toward a direction moving away from said grip;

means for locking said operation lever at a closing position near said grip;

gear means mounted on a proximal end of said barrel portion and engaging with an end of said operation lever;

a front cover mounted on a distal end of said barrel portion for accommodating said charger connector; and coupling means mounted on said barrel portion movably along the longitudinal direction of said barrel portion and having an end coupled to said gear means and the other end coupled to either one of both said connectors.

2. A coupling device according to claim 1, wherein said gear means include an intermediate gear and a pinion which engage with each other, said intermediate gear being engaged with a sector gear provided on an end of said operation lever and said pinion being engaged with a rack provided on an end of said coupling means, wherein said coupling means are provided on the other end with engaging means, and wherein said coupling means are moved back toward the proximal end of said barrel portion, so that said engaging means engage with said car connector, when said operation lever is actuated to move to said closing position, thereby interconnecting both said connectors.

3. A coupling device according to claim 1, wherein said gear means include a pinion, said pinion being engaged with a sector gear provided on an end of said operation lever and a rack provided on an end of said coupling means, wherein the other end of said coupling means is connected to said charger connector; wherein said charger connector is received slidably in said front cover, and wherein said coupling means are moved forth toward the distal end of said barrel portion, when said operation lever is actuated to move said closing position, thereby interconnecting both said connectors.

4. A coupling device according to claim 1 wherein said locking means include a member which detachably interconnects lower ends of said operation lever and grip.

5. A coupling device according to claim 1, further comprising means for starting electrical conduction when both said connectors are completely coupled.

6. A coupling device according to claim 2, further comprising a mechanism for temporarily and detachably coupling both said connectors.

7. A coupling device according to claim 2, further comprising means for restraining said operation lever from moving to said closing position until both said connectors reach a given incomplete coupling position.

8. A coupling device according to claim 3, further comprising means for restraining said operation lever from moving to said closing position until both said connectors reach a given incomplete coupling position.

9. A coupling device according to claim 4, wherein said coupling member is a retaining ring.

10. A coupling device according to claim 4, wherein said coupling member is a plunger.

11. A coupling device according to claim 5, wherein said coupling member is a lock piece.

12. A coupling device according to claim 5 wherein said starting means of electrical conduction include a switch which is closed when said operation lever is moved to said closing position.

13. A coupling device according to claim 5 wherein said starting means of electrical conduction include a switch member provided on a pushing portion of said operation lever for turning a charging circuit off only upon actuating said pushing portion.

* * * * *